R. SIEGFRIED.
ELECTRICALLY PROPELLED VEHICLE.
APPLICATION FILED APR. 10, 1908. RENEWED MAR. 20, 1911.
993,559.
Patented May 30, 1911.
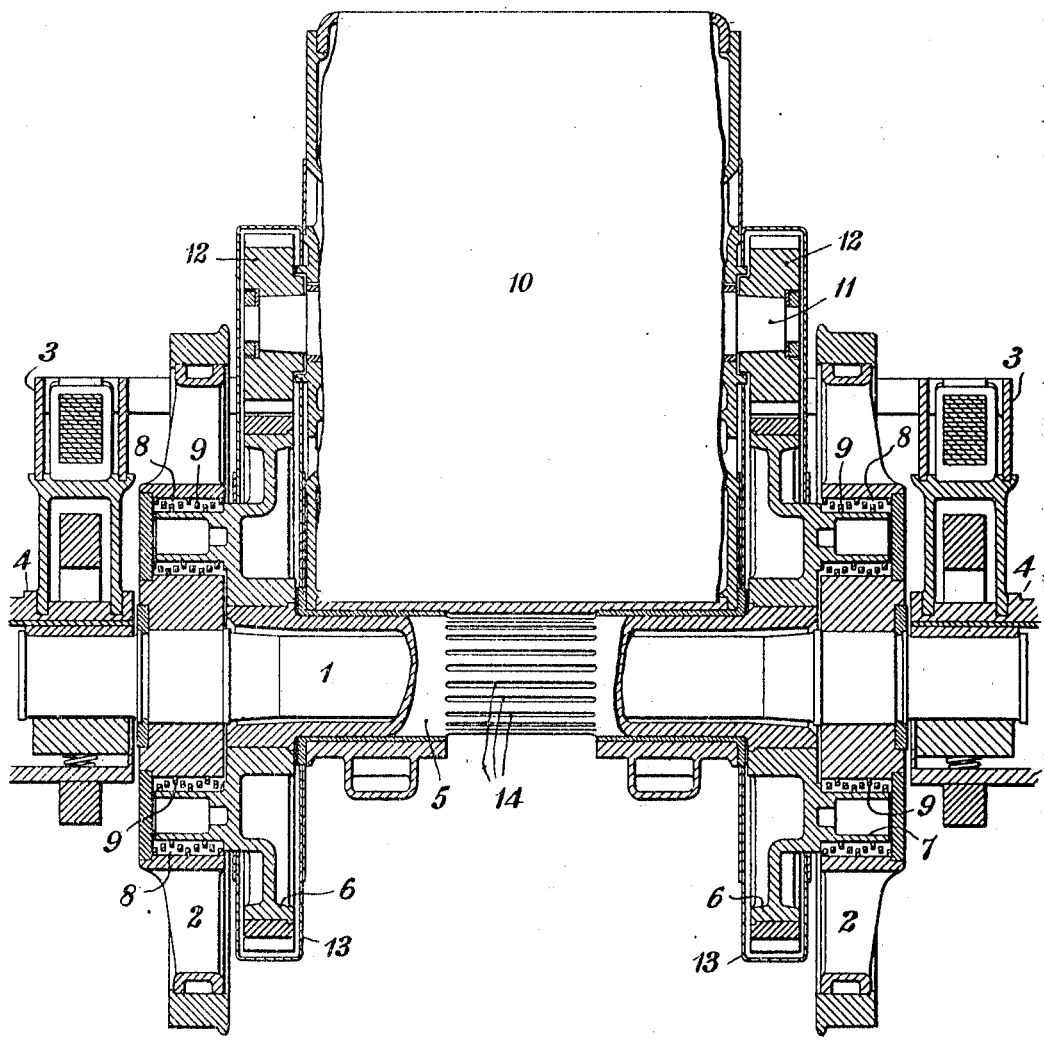
WITNESSES:
C. L. Belcher
Otto J. Schaver
INVENTOR
Robert Siegfried
BY
Wesley G. Carr
ATTORNEY

UNITED STATES PATENT OFFICE.

ROBERT SIEGFRIED, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

ELECTRICALLY-PROPELLED VEHICLE.

993,559. Specification of Letters Patent. Patented May 30, 1911.

Application filed April 10, 1908, Serial No. 426,392. Renewed March 20, 1911. Serial No. 615,657.

*To all whom it may concern:*

Be it known that I, ROBERT SIEGFRIED, a citizen of the United States, and a resident of Pittsburg, in the county of Allegheny and State of Pennsylvania, have invented a new and useful Improvement in Electrically-Propelled Vehicles, of which the following is a specification.

My invention relates to electrically propelled vehicles and particularly to means for mounting the propelling motors of such vehicles and operatively connecting their armatures to the driving wheels of the vehicle.

My invention contemplates the utilization of a structure in which the motor armature is operatively connected to both wheels o a truck axle by means of speed-reducing gearing, and it has for its object to insure the proper adjustment and operation of both sets of speed-reducing gearing by introducing a flexible connection between them.

The single figure of the accompanying drawing is a view mainly in section, but partially in elevation, of two truck wheels and their axle and a coöperating motor gearing, etc.

The axle 1 upon which the truck wheels 2 are rigidly mounted, projects beyond the said wheels and its projecting ends support the truck frame 3 by means of suitable bearing boxes 4, in the usual manner.

Surrounding the axle 1 between the wheels 2 is a sleeve or quill 5, the internal diameter of which is somewhat larger than the external diameter of the axle. Rigidly mounted upon the respective ends of the quill, adjacent to the wheels 2, are gear wheels 6 having laterally projecting studs 7 which are located in corresponding chambers or recesses 8 in the wheels and are surrounded by cushioning and driving springs 9, substantially as shown in Patent #816,611.

The motor 10 may be partially supported in the truck frame by any suitable well known means and may also be located either at the side or above the axle. In the present case, however, I have shown the motor as mounted with its armature shaft 11 vertically above the axle 1, the ends of the armature shaft being provided with pinions 12 which mesh with the respective gear wheels 6. Each pinion 12 and its coöperating gear wheel 6 may be inclosed in a suitable gear case 13, as indicated.

The structure thus far described is satisfactorily operative only in case the two sets of gears 6—12 are exactly alike and the motor is so mounted that there shall be no variation of adjustment as regards the two ends of the armature shaft. Inasmuch as it is impossible to secure such exact uniformity in practice as is necessary to successful operation, in case the two gear wheels are rigidly connected together, I provide a flexible connection and, as here shown, this flexible connection is embodied in the quill, the central portion of which is provided with a considerable number of longitudinal slots 14 which are preferably spaced uniformly around the periphery, the result being that the two ends of the quill are connected together by a plurality of springs which may be resiliently bent to accommodate the structure to any variations in the form or dimensions of the two sets of gears or to any inequalities in the adjustment of other relatively movable parts.

While I have found the particular device shown and described to be especially well adapted, both structurally and functionally, to effect the desired results, I desire it to be understood that other flexible connections between the two sets of gears may be substituted for that shown without departing from the spirit of my invention.

I claim as my invention:

1. The combination with a pair of truck wheels and a driving motor, of speed-reducing gears between the respective ends of the motor armature shaft and the truck wheels and a flexible connection between like members of the two sets of gears.

2. The combination with a pair of truck wheels and a driving motor, of pinions on the ends of the motor armature shaft, gear wheels meshing with said pinions and flexibly connected to said truck wheels and a flexible connection between said gear wheels.

3. The combination with a pair of truck wheels and an axle therefor, of a quill surrounding said axle and having a flexible section intermediate its ends, gear wheels mounted on the ends of said quill and flexibly connected to said truck wheels, and an electric motor having pinions on its armature shaft which mesh with said gear wheels.

4. The combination with a pair of truck wheels and their axle, of a pair of gear wheels operatively joined to said truck wheels and flexibly connected together, and an electric motor having pinions on its armature shaft which mesh with said gear wheels.

5. The combination with a pair of truck wheels and an axle by which they are rigidly connected, of a quill surrounding the axle and having a plurality of longitudinal slots intermediate its ends, gear wheels mounted on the ends of the quill and coupled to the truck wheels and a motor having driving pinions which mesh with said gear wheels.

6. The combination with a pair of truck wheels and an axle therefor, of a quill surrounding said axle and having a longitudinally slotted middle section, gear wheels mounted on the ends of the quill and connected to said truck wheels, and a motor having driving pinions which mesh with said gear wheels.

In testimony whereof, I have hereunto subscribed my name this 30th day of March, 1908.

ROBERT SIEGFRIED.

Witnesses:
OTTO S. SCHAIRER,
BIRNEY HINES.